Figure 6:
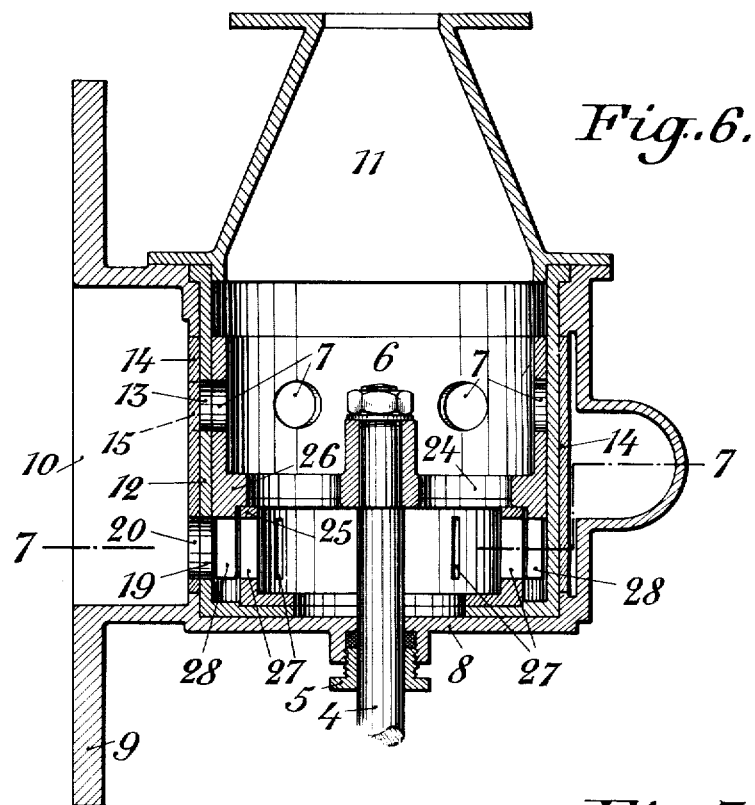

H. HECHT.
WATER SIREN.
APPLICATION FILED NOV. 1, 1911.
1,143,703.
Patented June 22, 1915.
5 SHEETS—SHEET 1.
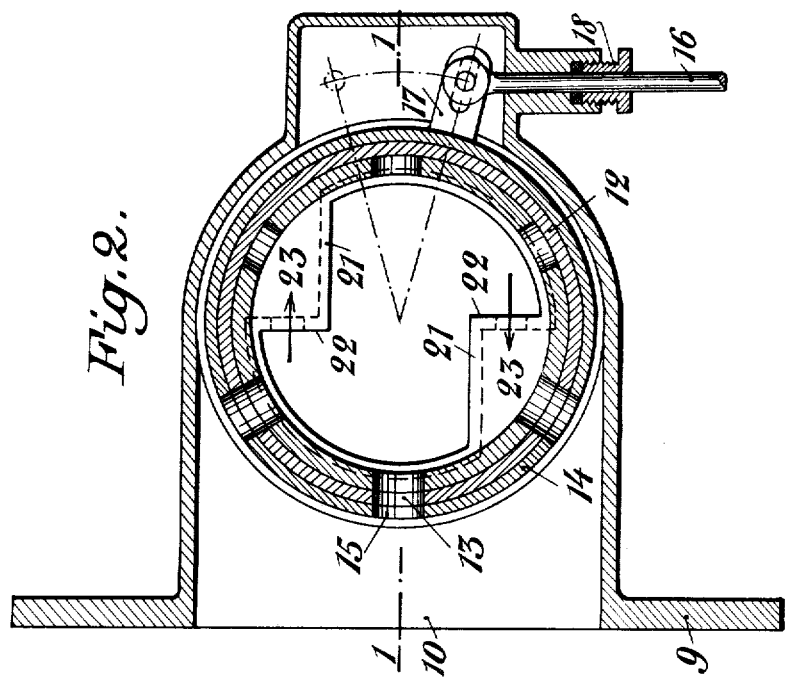
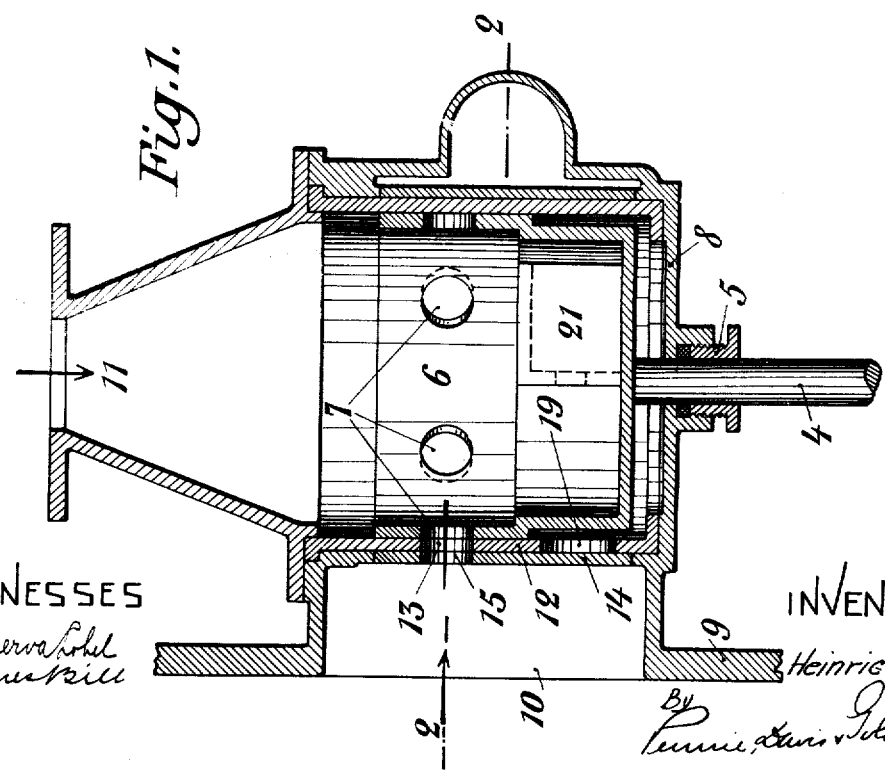
WITNESSES
INVENTOR
Heinrich Hecht

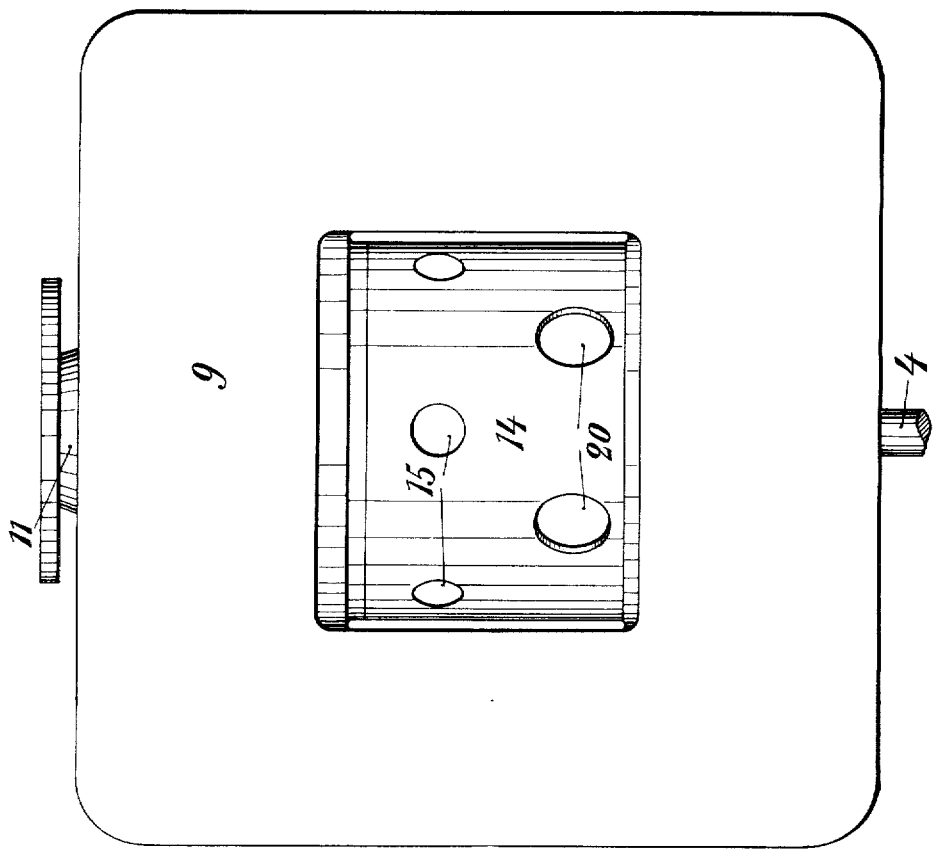

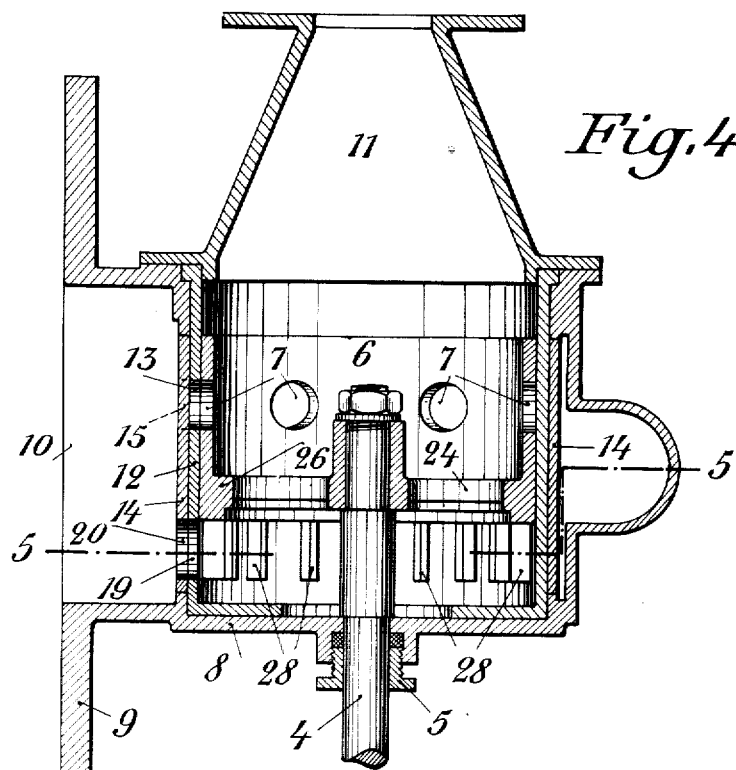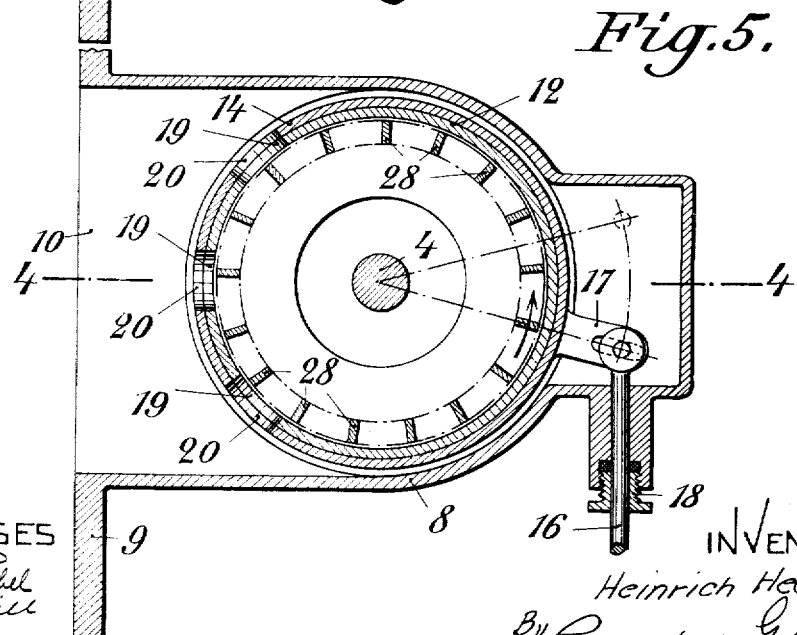

H. HECHT.
WATER SIREN.
APPLICATION FILED NOV. 1, 1911.

1,143,703.

Patented June 22, 1915.
5 SHEETS—SHEET 4.

WITNESSES
Minerva Lobel
Agnes Bill

INVENTOR
Heinrich Hecht
By
Pennie, Davis, Glasbrough
Attys.

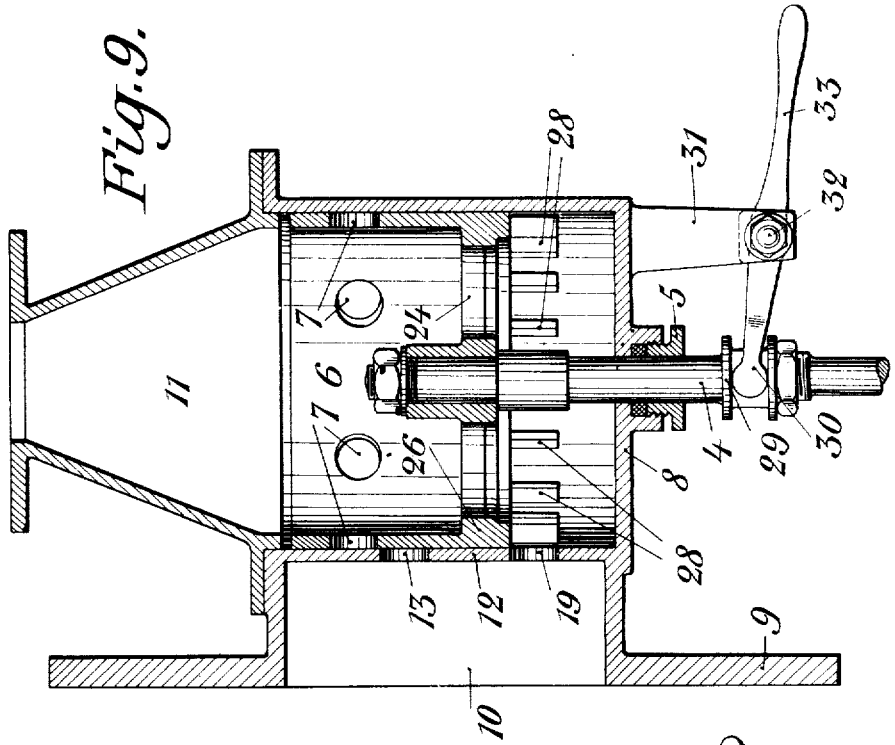
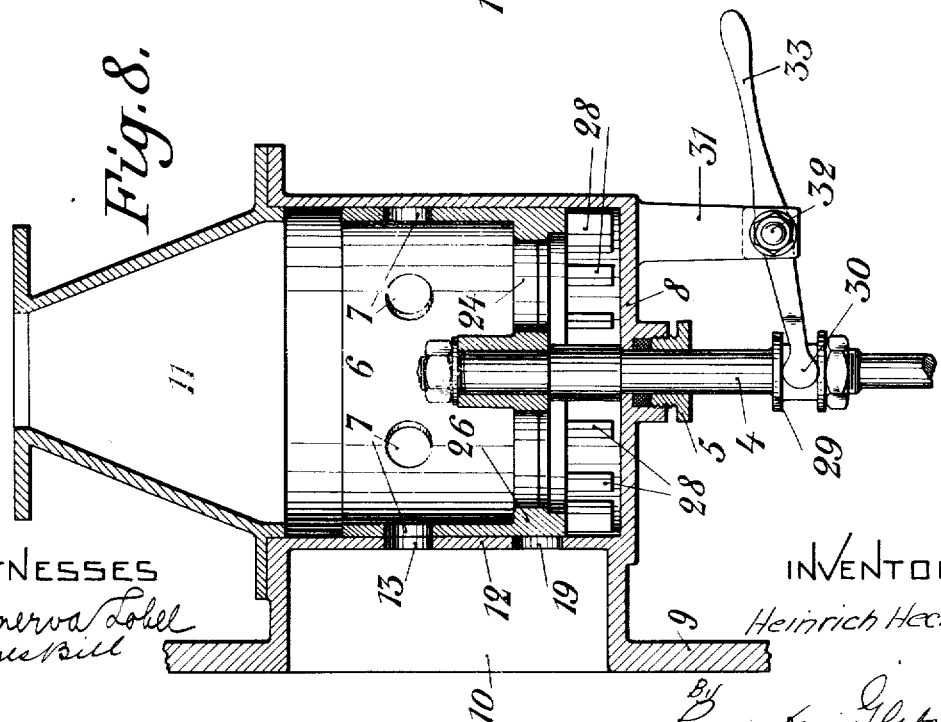

UNITED STATES PATENT OFFICE.

HEINRICH HECHT, OF KIEL, GERMANY.

WATER-SIREN.

1,143,703.    Specification of Letters Patent.    Patented June 22, 1915.

Application filed November 1, 1911. Serial No. 657,949.

*To all whom it may concern:*

Be it known that I, HEINRICH HECHT, a subject of the Emperor of Germany, residing at Kiel, 62 Holtenauerstrasse, Germany, have invented certain new and useful Improvements in Water-Sirens; and I do hereby declare the following to be a full, clear, and exact description of the invention, such as will enable others skilled in the art to which it appertains to make and use the same.

The present invention relates to apparatus for signaling by the sudden emission and extinction of a note by a siren, which is operated by and under water, and the object of the invention is to make it possible to produce a series of distinct tones of a pitch and force substantially uniform, whereby predetermined submarine signals may be effectively transmitted to suitable, preferably tuned, receivers.

In the case of air and steam sirens continuously rotated by suitable motors, it is well known that predetermined signals may be produced at will by alternately admitting and cutting off the gas to the siren, either by means of a cock in the supply pipe or by means of a movable slide covering the outlets of the siren. If these methods are applied to water sirens, each time the water is cut off from the siren to end a signal the inertia of the water current subjects the siren to a violent shock; and each time that the water is admitted again to the siren to initiate a signal a perceptible interval of time elapses before the water again attains its full velocity, and consequently the force of the tone is not uniform. Furthermore, if there is used for impelling the water, a centrifugal pump, or any other apparatus in which variations of flow react directly on the driving force, the variations in load incident to shutting off and reëstablishing the current of water result in corresponding variations of the speed and consequently the inertia of the impelling pump, to such an extent as to be detrimental to the production of signals of the kind desired, especially where it is attempted to maintain the transmitter and receiver in tuned relation with one another.

In accordance with the present invention, these difficulties arising from variations in the inertia of the moving body of water, or from variations in inertia of the impelling apparatus, are obviated by maintaining a flow of water through the siren during the periods of silence substantially equal to the flow of water during the periods of sounding. This may be effected, for example, by providing secondary outlets so designed that the water flows at the same rate through them during the periods of silence as it flows through the sound orifices during the periods of sounding, and providing means for shunting the flow of water through the sound orifices of the siren to produce a signal, or through the secondary outlets to silence the siren. If desired, the water issuing from the secondary outlets may be piped back to the suction side of the pump.

In order to make the flow of water through the secondary outlets during the periods of silence exactly equivalent in all respects to the flow of water through the sounding orifices of the siren during periods of sounding, so that variations of inertia of the moving body of water and also of the impelling apparatus are entirely avoided, it is necessary that both the rate of flow, that is the volume passing a given point in a given interval of time, and the velocity of the water should be the same in both cases, that is, whether the signal is sounding or not. This condition can generally be fulfilled by suitably designing the secondary outlets in accordance with the sound orifices of the siren. Inasmuch, however, as it is only the force of the tones which is here involved, it is possible to attain good practical results in many cases by maintaining constant at all times, whether the siren is sounding or silent, the rate of flow of the water, or the velocity of the water, or the product of the rate of flow and velocity. In either case, the great variations in inertia of the moving body of water and of the impelling motor, are substantially avoided, so that no hammer blow occurs, and the force of the tone is not subjected to objectionable variations.

An apparatus suitable for attaining the purposes of the invention may consist in a structure in which a slide having suitable orifices is provided for covering and uncovering the sound orifices in the continuously driven drum or rotor of the siren, the slide being capable of movement through a distance equal to or slightly greater than the diameter of one orifice in the drum or rotor, whereby the sound orifices in the siren may be opened or closed at will; and in conjunction with this mechanism there may be provided a secondary outlet or outlets, which will preferably be so arranged that the movement of the slide which opens the sound orifices will close the secondary outlets, and the movement of the slide which closes the sound orifices will open the secondary outlets. This may be effected, for example, by providing a stationary wall separating the rotor from the water outside, said wall having one series of orifices corresponding to the sound orifices of the siren and another series of orifices communicating with a suitable port or ports in the rotor, the movable slide having, in addition to the orifices which open and close the sound orifices of the siren, a secondary set of orifices which open and close the secondary outlets, the respective series of orifices being so arranged that when the sound orifices are opened by the slide the secondary outlets are closed and vice versa.

In the above indicated manner the flow of water from the source of water supply may be maintained during the periods of silence, to thereby prevent the objectionable effects which are necessarily incident to shutting off this flow, and the suggested structure furthermore lends itself admirably to the prevention of undesirable variations in the speed of the rotor which would have the effect to vary the pitch of the note. It will be understood that during the periods of sounding the periodical cutting off of the flow of the water by the rotor consumes power, so that as soon as the siren is silenced by closing the sound orifices a part of the load is removed from the motor which drives the rotor and this would ordinarily result in a variation of speed of the rotor and a consequent change in the pitch of the note. In accordance with the present invention this defect is obviated by compensating during the periods of silence for the additional load imposed on the driving motor of the rotor during the periods of sounding, to thereby maintain a constant speed of the rotation of the rotor. In the embodiment of the invention herein illustrated and described this effect is attained by causing the water which flows through the secondary outlets to react upon the body of the rotor to such a degree as to equalize, during the respective periods of sounding and of silence, the resistance opposed to the power of the driving motor. In other words the part of the rotor wall opposite the secondary outlets is constructed in such manner that the streams of water issuing through the secondary outlets during the periods of silence exert a braking action on the rotor of the siren.

Instead of providing the movable slide as above suggested, it is possible to so mount the rotor drum itself that it is capable of axial displacement, so that in one position the sound orifices of the rotor register with the corresponding ports of the stationary casing, and in the other position of the rotor a suitable outlet or outlets in the rotor register with the secondary ports in the secondary casing.

Figure 7:
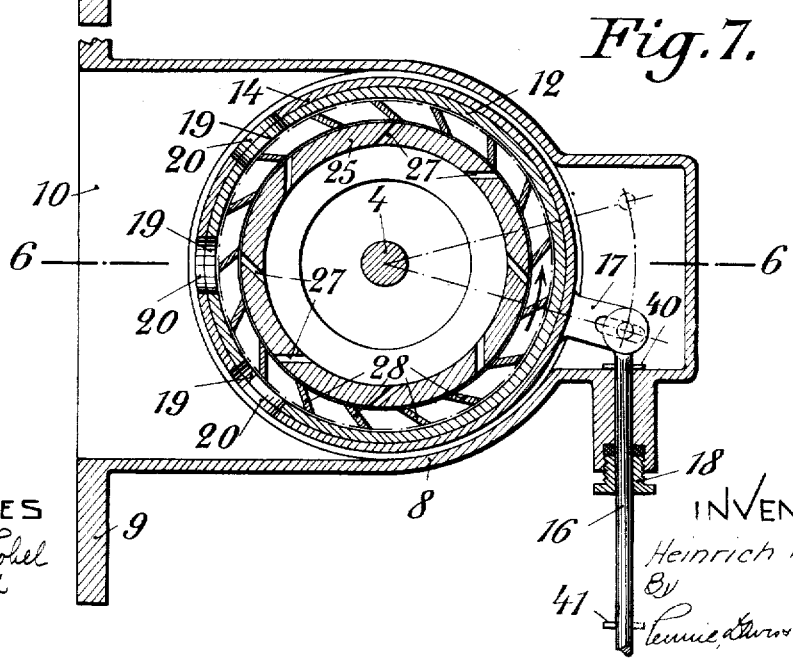

In the accompanying drawings forming part of this specification, Figure 1 is a longitudinal section on line 1—1 of Fig. 2, through a drum siren constructed in accordance with the present invention; Fig. 2 is a cross-section on line 2—2 of Fig. 1; Fig. 3 is an end elevation in the direction of the arrow in Fig. 1; Fig. 4 is a longitudinal section on line 4—4 of Fig. 5, through a siren provided with a brake turbine; Fig. 5 is a cross section on line 5—5 of Fig. 4; Fig. 6 is a longitudinal section on line 6—6 of Fig. 7 through a siren provided with a modified form of brake turbine; Fig. 7 is a cross section on line 7—7 of Fig. 6; Fig. 8 is a longitudinal section through a siren provided with a brake turbine, and a rotor capable of axial displacement, the rotor being shown in a position for sounding a signal; and Fig. 9 is similar to Fig. 8 except that the rotor is shown in the position for silence.

According to the embodiment shown in Figs. 1 to 3, the driving shaft 4 rotates in a stuffing box 5, and is driven by any suitable form of motor (not shown). On the shaft 4 is rigidly secured a drum or rotor 6 having sound orifices 7 on its cylindrical surface. The rotor 6 rotates in an outer casing 8, which, by means of a flange 9, may be secured in contact with the outside water, for instance to the hull of the ship. The interior of the casing 8 is in connection with the outside water through a wide sound opening 10, while on the side of the casing opposite the stuffing box the rotor 6 is open and is supplied with water from a suitable source through the hood 11 flanged to receive a water supply pipe, (not shown). Inside of the casing 8 is fixed a stationary cylindrical housing or wall 12 into which the rotor 6 fits as closely as possible without preventing free rotation of the rotor. Opposite the sound port 10 the sound orifices 13 are arranged in the stationary casing 12 so as to periodically register with the sound orifices 7. The wall 12 is surrounded by a tightly fitting sleeve 14 capable of being turned through a certain angle, and having orifices 15 arranged opposite the sound opening 10. The orifices 15 are so dimensioned and so disposed that when the sleeve 14 is in the position for the emission of a signal, they register with the orifices 13 in the stationary casing 12. The metal between adjacent orifices in the fixed casing 12 and in the movable sleeve 14 is in each case at least as wide as the orifices 13 and 15, so that when the sleeve 14 is turned through a distance equal to the width of an orifice, the sound orifices 13 are completely closed. In order to turn the sleeve 14, a lug 17 is secured thereto on the side away from the sound opening 10, and a rod 16 connected to the lug 17 and guided in a stuffing box 18 is provided, the movement of the rod 16 being preferably limited by two stops 40 and 41 so that by operating the rod by hand or by any other suitable means, the sleeve 14 is turned through an angle equal to one-half the distance between the centers of adjacent orifices 13, whereby in one position of the rod the sound orifices 13 and 15 are open while in the other position they are closed.

In addition to the sound orifices 13 in the stationary sleeve 12 there is a second series of openings 19 which register with a corresponding series of openings 20 in the sleeve 14 when the sleeve is turned to the position of silence of the siren. The openings 19 are directly in line with the sound orifices 13 and the orifices 20 in the sleeve 14 are circumferentially displaced by the angular distance through which the sleeve may be turned. When, therefore, the siren is silent the openings 20 are in register with the openings 19, so that the current of water entering from the hood 11 passes out through these openings. It is obvious that the same result would be secured by arranging the openings 20 directly in line with the sound orifices 15, if at the same time the openings 19 were displaced with respect to the sound orifices 13.

If it is intended to compensate only for the variations in load on the impelling motor and variation in the inertia of the moving body of the water, it is only necessary to provide a circumferential slot in the rotor 6 in line with the openings 19 and 20 in the stationary wall 12 and the sleeve 14. Such a slot can be made by providing several openings in the lower part of the rotor 6 and giving the rotor a smaller diameter at that part than at the upper part, as shown in Fig. 1. By suitably proportioning the openings, there is obtained a constant flow of water through the openings 19 and 20 when the sound orifices 13 and 15 are closed during silence. Since the openings 19 and 20 are not periodically opened and closed as a result of the rotation of the rotor, they may be made smaller than the orifies 13 and 15. If it is intended to compensate further for the variations in load on the motor which drives the rotor of the siren, the water passing through the sound orifices 13 and 15 may be caused to react upon the rotor. The drawings show various forms of siren suitable for that purpose. Thus in the device of Figs. 1 to 3, inclusive, a chamber 21 is formed in the inner end of the rotor 6 and has two substantially radial walls 22 provided with outlets 23. The water entering at 11 passes into the chamber 21, and when the sound orifices 13 and 15 are closed the water flows from the opening 23 through the openings 19 and 20, thereby exerting a tangential reaction on the rotor. By suitably inclining the walls 22 the amount of this reaction may be so adjusted that the power required from the motor when the siren is silent is equal to the power required when the signal is being sounded. With this arrangement the water must pass through the openings 19 and 20 after leaving the rotor 6, and the velocity of the outflow from the rotor, and consequently the reaction pressure, is dependent upon the relation between the total area of the openings in the rotor and the total area of the outlets 19 and 20. If the area of the openings in the rotor is not small in comparison with the area of the openings in the casing, a difference of pressure will be established between the casing and the external water which may be nearly as great as the working pressure of the siren, so that the kinetic energy of the issuing water current will not be exerted at the circumference of the rotor but will be exerted at the circumference of the casing where it cannot produce the desired effect. On the other hand, if the openings 19 and 20 are increased in area relatively to the openings 23, the siren becomes inconveniently large.

The embodiment shown in Figs. 4 to 7, overcomes this difficulty by using the impact of the issuing stream of water, instead of the reaction pressure, to produce the desired compensating load on the rotor of the siren. In this case the rotor is provided with a set of blades projecting into the current of water which passes through the secondary outlets 19 and 20 when the signal is not being sounded. By suitably fixing the inclination of the blades 28 with relation to the direction of the current of water, the additional load imposed on the motor may be made equal to the additional load resulting from forcing the water through the sound orifices. This braking effect on the rotor can be further increased, if necessary, by deflecting the stream of water tangentially to the rotor and in an opposite direction to the rotation thereof by means of guide channels. In order to make the braking action more uniform, the number of channels and the number of blades should be prime numbers to each other. In this manner a braking action of any desired amount may be easily obtained, but it is essential that the space between the blades on the rotor and the adjacent part of the casing, and also the mouths of the guide channels be not too small, for otherwise the braking action may produce an audible tone. The rotor 6, is provided with a rim 26 projecting beyond its base and carrying the blades 28 opposite the orifices 19 and 20. When the rotor rotates, the blades 28 impart a tangential movement to the water, a portion of which flows in a radial direction toward the openings 19 and 20. The required compensating load may be adjusted by changing the inclination of the blades so that the total load on the motor may be kept constant. In this way the speed of rotation of the rotor is maintained constant at all times, whether the siren is proudcing a signal or not.

In order to increase the braking action, a cylindrical wall 25 may be provided in the casing as shown in Figs. 6 and 7. This wall is surrounded by the rim 26 which extends beyond the bottom of the rotor and which carries the blades 28. In the wall 25 are arranged inclined channels 27 for deflecting the current of water in a direction opposite to that of the rotation of the rotor, while the blades are inclined oppositely to the channels.

In the embodiment shown in Figs. 8 and 9, the rotor is capable of axial displacement, so that in the operative position of the rotor as shown in Fig. 8, the sound orifices 7 of the rotor register with the sound orifices 13 of the casing, while the secondary openings 19 are then covered by the continuous portion of the wall of the rotor. In this way, the separate sleeve 14 of the previous forms of construction is rendered unnecessary. A collar 29 provided with a groove is attached to the shaft 4, and the casing 8 has an extension 31 carrying a pin 32, which serves as a pivot for a lever 33. The end 30 of the lever 33 is forked and embraces the collar 29, while the other end of the lever is provided with a handle 33 so that when the handle is depressed the rotor is moved into the position shown in Fig. 9, whereby the sound orifices 7 and 13 are closed while the secondary outlets 19 are opened, whereas when the handle 33 is raised as shown in Fig. 8 the sound orifices 7 and 13 periodically register with each other while the secondary outlets 19 are closed.

Having thus described my invention what I claim is:—

1. The method of operating a motor-driven water siren which consists in maintaining substantially constant during the periods of sounding and of silence the inertia of the moving parts of the water-impelling motor and of the body of water impelled thereby; substantially as described.

2. The method of operating a water siren which consists in maintaining a flow of water therethrough during the period of silence substantially equal to the flow of water therethrough during the period of sounding, whereby tone variations arising from the in- ertia of the body of water are avoided; substantially as described.

3. The method of operating a water siren which consists in maintaining a flow of water therethrough during the period of silence substantially equal to the flow of water therethrough during the period of sounding, whereby tone variations arising from the inertia of the body of water are avoided, and equalizing during the respective periods the resistance opposed to the power of the motor which drives the rotor of the siren, to prevent variations in the frequency of the sound-producing interruptions of the water flow; substantially as described.

4. The method of preventing variations in the frequency of the sound-producing interruptions of the water flow in a water siren, which consists in equalizing during the periods of sounding and of silence the resistance opposed to the power of the motor which drives the rotor of the siren; substantially as described.

5. The method of preventing variations in the frequency of the sound-producing interruptions of the water flow in a water siren which consists in compensating during the period of silence for the additional load imposed on the driving motor of the siren's rotor during the periods of sounding, to thereby maintain a constant speed of rotation of the rotor; substantially as described.

6. A continuously driven water siren installation having sound producing means, and a secondary outlet, in combination with mechanism for shunting the current of water through the sound producing means to produce a signal or through the secondary outlet to silence the siren, the secondary outlet being beyond the sound-producing means in the direction of flow of the water, whereby the flow of water through the siren is maintained during the periods of silence; substantially as described.

7. A continuously driven water siren installation having sound producing means and a secondary outlet, in combination with mechanism for shunting the current of water through the sound producing means to produce a signal or through the secondary outlet to silence the siren, and means for equalizing the operating power required to drive the siren during the periods of silence with the power required to drive the siren during the periods of sounding; substantially as described.

8. A continuously driven water siren installation having sound producing means and a secondary outlet, in combination with mechanism for shunting the current of water through the sound producing means to produce a signal or through the secondary outlet to silence the siren, and compensating devices for maintaining a substantially constant resistance to the rotation of the siren and also for maintaining a substantially constant resistance to the flow of water during the periods of sounding and of silence; substantially as described.

9. In a continuously driven water siren through which water is continuously passed, a rotor having a sound orifice through which the water passes to produce a signal, a stator having a secondary outlet through which the water passes during the silence of the siren, means for establishing and interrupting the flow of water through the sound orifice, and for establishing and interrupting the flow of water through the secondary outlet; substantially as described.

10. In a continuously driven water siren through which water is continuously passed, a rotor having a sound orifice through which the water passes to produce a signal, a stator having a secondary outlet through which the water passes during the silence of the siren, and means for opening the sound orifice and simultaneously closing the secondary outlet to produce a signal, and for opening the secondary outlet and simultaneously closing the sound orifice to silence the siren; substantially as described.

11. In a continuously driven water siren through which water is continuously passed, a rotor having sound orifices and a secondary outlet, a stator having sound orifices arranged to periodically communicate with the sound orifices of the rotor during a signal and having a secondary outlet arranged to communicate with the secondary outlet of the rotor during silence of the siren, and means for establishing communication of the respective sound orifices and interrupting the communication of the secondary outlets to produce a signal, and for interrupting the communication of the sound orifices and establishing communication between the secondary outlets to silence the siren; substantially as described.

12. In a continuously driven water siren through which water is continuously passed, a rotor having sound orifices and a secondary outlet, a stator having sound orifices arranged to periodically communicate with the sound orifices of the rotor during a signal and having a secondary outlet arranged to communicate with the secondary outlet of the rotor during silence of the siren, and means for establishing communication of the respective sound orifices and interrupting the communication of the secondary outlets to produce a signal, and for interrupting the communication of the sound orifices and for establishing communication between the secondary outlets to silence the siren, and means interposed in the secondary outlet path for increasing the operating power otherwise required to drive the siren during period of silence; substantially as described.

13. In a continuously driven water siren through which water is continuously passed, a rotor having sound orifices and having a secondary outlet, a stator having sound orifices arranged to periodically communicate with the sound orifices of the rotor during a signal and having secondary outlets arranged to communicate with the secondary outlet of the rotor during silence of the siren, and a movable slide having openings so arranged that, in the position to produce a signal, communication is established between the sound orifices while communication is interrupted between the secondary outlets, and, in the position for silence, communication is interrupted between the sound orifices while communication is established between the secondary outlets; substantially as described.

14. In a continuously driven water siren through which water is continuously passed, a rotor having sound orifices and having a secondary outlet, a stator having sound orifices arranged to periodically communicate with the sound orifices of the rotor during a signal and having secondary outlets arranged to communicate with the secondary outlet of the rotor during silence of the siren, a movable slide having openings so arranged that, in the position to produce a signal, communication is established between the sound orifices while communication is interrupted between the secondary outlets, and, in the position for silence, communication is interrupted between the sound orifices while communication is established between the secondary outlets, and vanes on the rotor interposed in the path of the water through the secondary outlets and so arranged as to increase the driving power otherwise required to drive the siren during the periods of silence; substantially as described.

15. In a continuously driven water siren through which water is continuously passed, a rotor having sound orifices and a secondary outlet, a stator having sound orifices arranged to periodically communicate with the sound orifices of the rotor during a signal and having a secondary outlet arranged to communicate with the secondary outlet of the rotor during silence of the siren, a movable slide having openings so arranged that, in the position to produce a signal, communication is established between the sound orifices, while communication is interrupted between the secondary outlets, and, in the position of silence, communication is interrupted between the sound orifices while communication is established between the secondary outlets, means for moving the slide from one to the other of said positions, vanes on the rotor, and stationary guide channels arranged in the path of the water through the secondary outlets to deflect the water against the vanes in such manner as to increase the power otherwise required to drive the siren during the periods of silence.

16. A water siren comprising a stator having a series of sound orifices and a series of secondary outlets at one side, a rotor within the stator having a series of sound orifices around its circumference in line with the sound orifices of the stator and also having a secondary outlet, a movable sleeve having orifices arranged to establish communication between the sound orifices and said sleeve serving also to interrupt communication between the secondary outlets in the position to produce a signal, and arranged to interrupt communication of the sound orifices and to establish communication between the secondary outlets in the position of silence, and vanes on the rotor in the path of the water through the secondary outlets to increase the power otherwise required to drive the siren during the periods of silence.

17. A water siren comprising a stator having a series of sound orifices and a series of secondary outlets at one side, a rotor within the stator having a series of sound orifices around its circumference in line with the sound orifices of the stator and also having a secondary outlet, a movable sleeve having orifices arranged to periodically establish communication between the sound orifices and said sleeve adapted to interrupt communication between the secondary outlets in the position to produce a signal, and arranged to periodically interrupt communication of the sound orifices and to establish communication between the secondary outlets in the position of silence, means for moving the sleeve from one to the other of said positions, vanes on the rotor in the path of the water through the secondary outlets, and a stationary member having a series of circularly arranged inclined openings to deflect the water against the vanes in such manner as to increase the power otherwise required to drive the siren at constant speed during silence.

18. A water siren having an exterior casing with two sets of water emission orifices, and an axially movable rotor within the casing having a series of sound orifices adapted to communicate with one set of the orifices in the casing when the rotor is in one axial position, and a secondary outlet adapted to communicate with the second set of orifices in the casing when the rotor is in another axial position and means for moving the rotor to establish communication between the sound orifices and the first set of casing orifices and interrupt communication between the secondary outlet and the second set of casing orifices, to sound the siren, or for establishing communication between the secondary outlet and the second set of casing orifices and interrupting communication between the sound orifices and the first set of casing orifices, to silence the siren.

In testimony whereof I affix my signature, in presence of two witnesses.

DR. HEINRICH HECHT.

Witnesses:
JULIUS RÖPKE,
PAUL POPPENDIECK.

Copies of this patent may be obtained for five cents each, by addressing the "Commissioner of Patents, Washington, D. C."

It is hereby certified that in Letters Patent No. 1,143,703, granted June 22, 1915, upon the application of Heinrich Hecht, of Kiel, Germany, for an improvement in "Water-Sirens," errors appear in the printed specification requiring correction as follows: Page 2, lines 72–73, for the word "secondary" read *stationary;* page 3, line 57, for the word "orifies" read *orifices;* page 4, line 13, for the word "proudcing" read *producing;* and that the said Letters Patent should be read with these corrections therein that the same may conform to the record of the case in the Patent Office.

Signed and sealed this 21st day of September, A. D., 1915.

[SEAL.]

J. T. NEWTON,
*Acting Commissioner of Patents.*